US011262808B2

(12) United States Patent
Daube et al.

(10) Patent No.: US 11,262,808 B2
(45) Date of Patent: Mar. 1, 2022

(54) WEARABLE ELECTRONIC DEVICE ACCESSORY INTERFACE

(71) Applicants:Nir Daube, Pacific Palisades, CA (US); Gerald Nilles, Culver City, CA (US); Jonathan M. Rodriguez, II, Beverly Hills, CA (US); Yu Jiang Tham, San Diego, CA (US)

(72) Inventors: Nir Daube, Pacific Palisades, CA (US); Gerald Nilles, Culver City, CA (US); Jonathan M. Rodriguez, II, Beverly Hills, CA (US); Yu Jiang Tham, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 68 days.

(21) Appl. No.: 16/799,381

(22) Filed: Feb. 24, 2020

(65) Prior Publication Data

US 2021/0173451 A1 Jun. 10, 2021

Related U.S. Application Data

(60) Provisional application No. 62/944,625, filed on Dec. 6, 2019.

(51) Int. Cl.
| | | |
|---|---|---|
| *H04B 1/3827* | (2015.01) | |
| *G06F 1/16* | (2006.01) | |
| *G02C 11/00* | (2006.01) | |
| *A44C 5/00* | (2006.01) | |
| *G01P 15/02* | (2013.01) | |

(Continued)

(52) U.S. Cl.
CPC .......... *G06F 1/1698* (2013.01); *A44C 5/0007* (2013.01); *G01C 19/00* (2013.01); *G01C 21/08* (2013.01); *G01P 15/02* (2013.01); *G02C 11/10* (2013.01); *G06F 1/163* (2013.01); *G06F 1/1632* (2013.01); *H02J 7/0042* (2013.01);
(Continued)

(58) Field of Classification Search
CPC ............................... G06F 1/1698; G06F 1/163
See application file for complete search history.

(56) References Cited

U.S. PATENT DOCUMENTS

| 2012/0194419 A1* | 8/2012 | Osterhout | ............ | G02B 27/017 |
| | | | | 345/156 |
| 2013/0241927 A1 | 9/2013 | Vardi | | |
| 2019/0325842 A1* | 10/2019 | Liang | ............ | G02B 27/017 |

FOREIGN PATENT DOCUMENTS

| CN | 204181126 | * | 3/2015 | ............ A45C 11/24 |
| CN | 204181126 U | | 3/2015 | |

(Continued)

OTHER PUBLICATIONS

International Search Report and Written Opinion for International Application No. PCT/US2020/060953, dated Feb. 18, 2021 (Feb. 18, 2021)—13 pages.

*Primary Examiner* — Tuan H Nguyen
(74) *Attorney, Agent, or Firm* — Culhane Meadows PLLC; Stephen J. Weed

(57) ABSTRACT

Systems and methods are presented for establishing a communication link between two or more electronic devices. A portable eyewear electronic device is configured to communicate with a handheld electronic device, such as a ring, that in turn is retained by an accessory electronic device to establish a wired communication link. The accessory electronic device may be retained or housed by a second accessory electronic device, such as a remote control or wearable device.

18 Claims, 7 Drawing Sheets

(51) Int. Cl.
  *G01C 21/08* (2006.01)
  *G01C 19/00* (2013.01)
  *H02J 7/00* (2006.01)
(52) U.S. Cl.
  CPC ..... *H04B 1/385* (2013.01); *H04B 2001/3861* (2013.01); *H04B 2001/3866* (2013.01)

(56) References Cited

FOREIGN PATENT DOCUMENTS

| | | |
|---|---|---|
| CN | 207442492 U | 6/2018 |
| KR | 20160142973 A | 12/2016 |
| WO | 2018047202 A1 | 3/2018 |

* cited by examiner

WEARABLE ELECTRONIC DEVICE ACCESSORY INTERFACE

CROSS-REFERENCE TO RELATED APPLICATIONS

This application claims priority to U.S. Provisional Application Ser. No. 62/944,625 entitled WEARABLE ELECTRONIC DEVICE ACCESSORY INTERFACE, filed on Dec. 6, 2019, the contents of which are incorporated fully herein by reference.

TECHNICAL FIELD

Examples set forth in the present disclosure relate to portable electronic devices, including wearable electronic devices such as eyewear. More particularly, but not by way of limitation, the present disclosure describes systems and methods for charging a handheld electronic device such as a ring and communication with one or more accessory electronic devices such as a charging dock.

BACKGROUND

Many types of computers and electronic devices available today, including wearable devices, include accessory charging and communication systems. Accessory charging system are useful for charging computers and electronic devices. Communication systems are useful for exchanging information with these devices.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1:
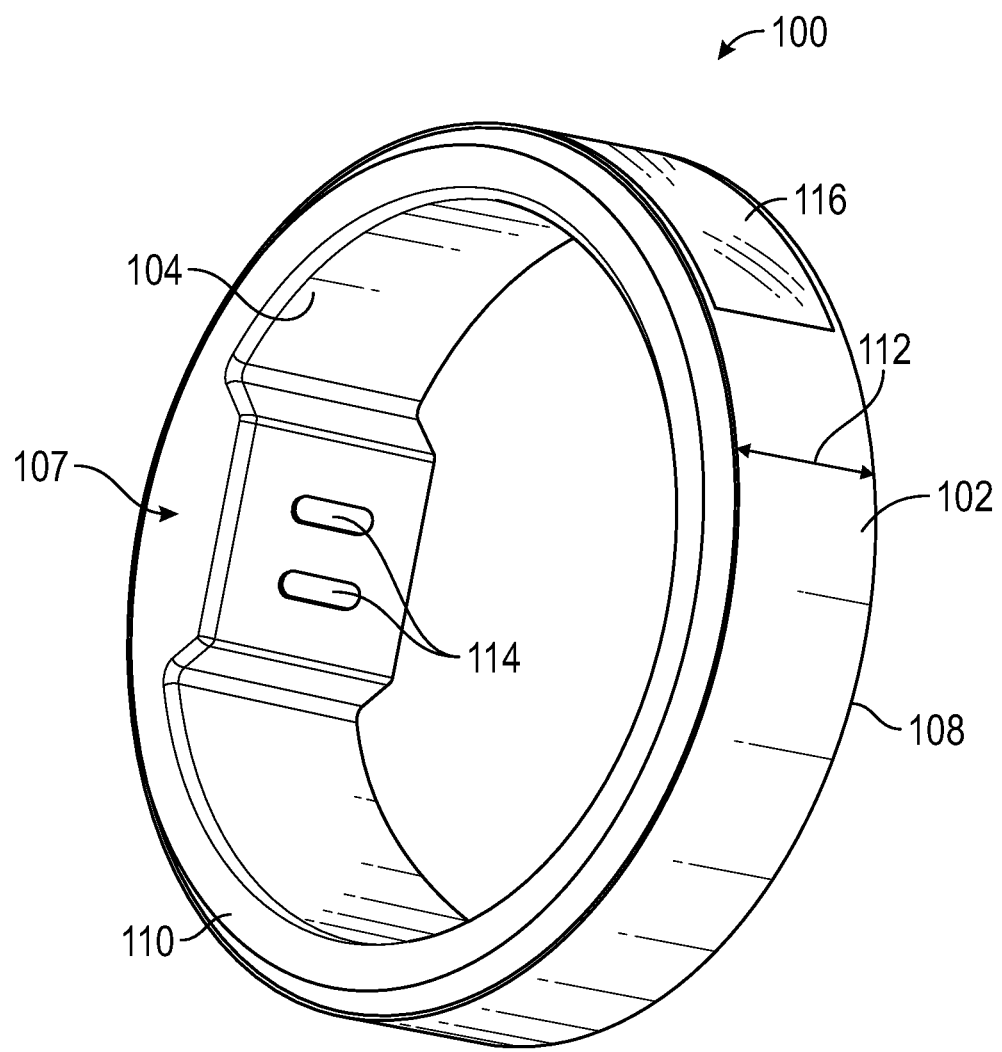
FIG. 1 is a perspective view of an example hardware configuration of a handheld electronic device that may be utilized with an eyewear electronic device in accordance with an example embodiment.

Various implementations and details are described with reference to examples. In one example a communication system includes an eyewear electronic device, a handheld electronic device (e.g., a ring) having an electronic communication interface, and an accessory electronic device (e.g., a docking station for the ring). The accessory device has a body sized to substantially engage the handheld electronic device and includes an electronic communication interface complementary to the handheld electronic device communication interface for transferring signals and/or power between the two devices when the respective communication interfaces are in physical contact. The accessory electronic device may be incorporated, housed, or appended to a second accessory device, such as a wearable electronic device or remote control device. In addition to the communication system, the systems and methods described herein may be applied to and used with any of a variety of systems, especially those in which a user desires to establish a direct communication link with a handheld electronic device and an accessory device for data and power transfer.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The term "connect", "connected", "couple" and "coupled" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1 is a perspective view of handheld electronic device 100. In the illustrated example, handheld electronic device (e.g., a smart ring) 100 includes outer surface 102 and inner surface 104 with the distance between inner and outer surfaces defining a thickness, which may vary, such as to form, for example, an internal space 106, as shown. Ring 100 further comprises first and second sides 108, 110 forming a width 112. The outer surface as illustrated includes touchpad 116, and the inner surface 104 includes charging and communication pins 114.

Figure 2:
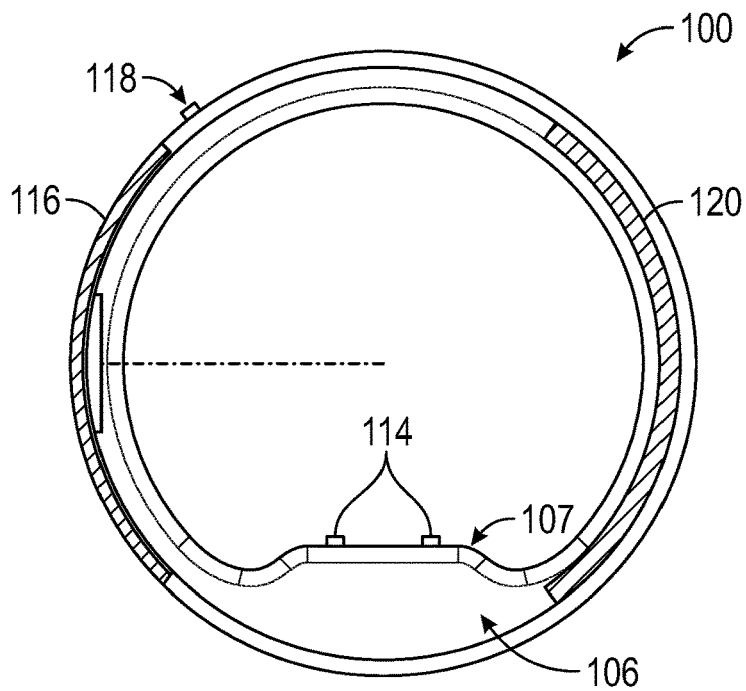
FIG. 2 is a sectional view of the handheld electronic device of FIG. 1.

FIG. 2 is a schematic view of an example hardware configuration for ring 100. The touchpad 116, as shown, may be sized and shaped to conform closely to a portion of outer surface 102 of the ring 100. The ring 100 may also include a lamp 118. The battery 120 may be sized and shaped to fit within the body of the ring 100, with connections to one or more charging and communications pins 114. As shown, internal space 106 (beneath pins 114 in this example) may house a variety of components, such as a touch driver 122, a touch controller 124, a short-range transceiver 126, a microcontroller 128, a memory 130, and an inertial measurement unit (IMU) 132, as shown in FIG. 3.

Figure 3:
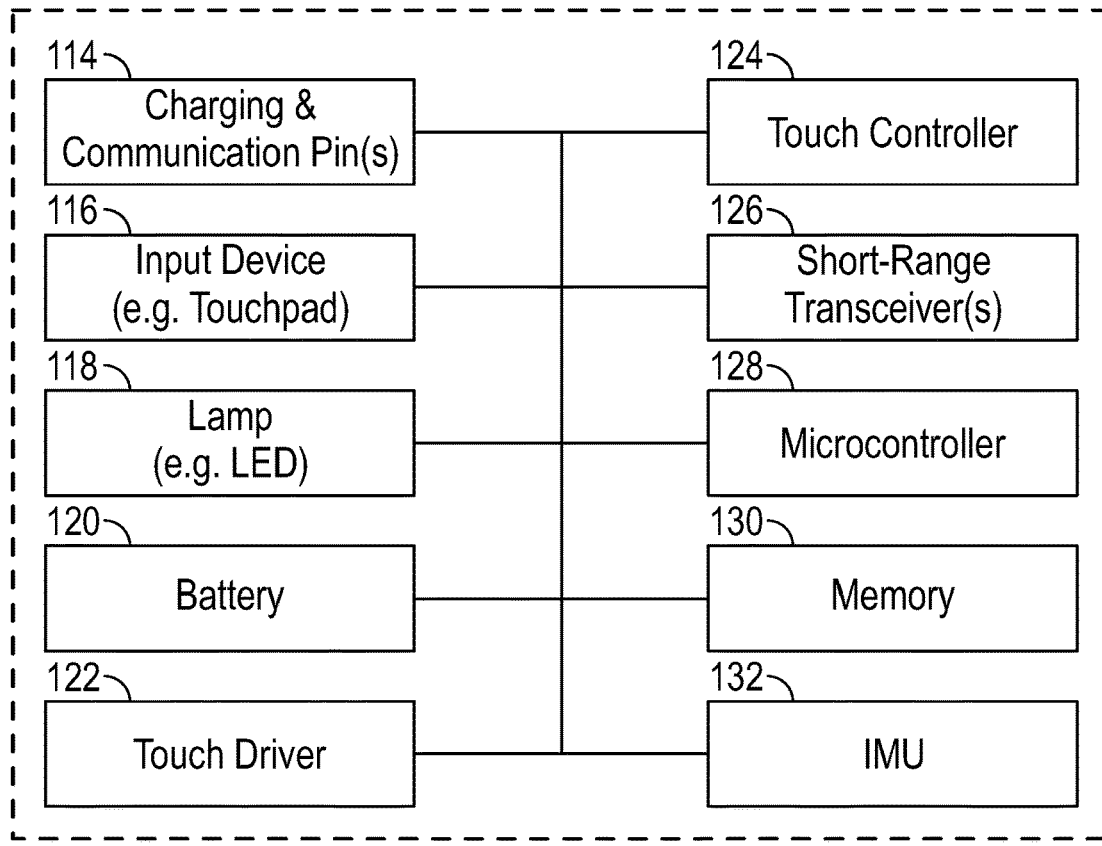
FIG. 3 is a diagrammatic representation of an example hardware configuration for a handheld electronic device (e.g., a smart ring) of FIG. 1.

FIG. 3 is a high-level functional block diagram of an example handheld electronic device, e.g. smart ring 100. Ring 100, as shown, includes an input device 116 (e.g., a touchpad), a lamp 118 (e.g., a light-emitting diode), a touch driver 122, a touch controller 124, a short-range transceiver 126, a microcontroller 128, a memory 130, an inertial measurement unit (IMU) 132, a battery 120, and one or more charging and communications pins 114.

Forming a handheld electronic device wireless communication interface, ring 100 includes at least one short-range transceiver 126 that is configured for short-range network communication, such as via NFC, VLC, DECT, ZigBee, Bluetooth™, BLE (Bluetooth Low-Energy), or WiFi. The short-range transceiver(s) 126 may take the form of any available two-way wireless local area network (WLAN) transceiver of a type that is compatible with one or more standard protocols of communication implemented in wireless local area networks. The handheld electronic device wireless communication interface is configured for communication with an eyewear communication interface.

The transceiver(s) 126 (i.e., the network communication interface) conforms to one or more of the various digital wireless communication standards utilized by modern mobile networks. Examples of transceivers include but are not limited to transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 126 provide two-way wireless communication of information including digitized audio signals, still image and video signals, web page information for display as well as web-related inputs, and various types of mobile message communications to or from the ring 100.

The ring 100 may also include a global positioning system (GPS) receiver. Alternatively, or additionally, the ring 100 can utilize either or both the short-range transceiver(s) 126 for generating location coordinates for positioning. For example, cellular network, WiFi, or Bluetooth™ based positioning systems can generate very accurate location coordinates, particularly when used in combination. Such location coordinates can be transmitted to one or more portable eyewear electronic devices 100, and/or to accessory electronic devices 400 (e.g., see FIGS. 4 and 11), and to one or more second accessory electronic devices 600 (e.g., see FIG. 11) over one or more network connections via the transceiver(s) 126.

The ring 100 further includes a microcontroller 128 that functions as a central processing unit (CPU) for the ring 100, as shown in FIG. 3. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the microprocessor. The microcontroller 128, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the microcontroller 128 or processor hardware in smartphone, laptop computer, and tablet. The microcontroller 128 serves as a programmable host controller by configuring the ring 100 to perform various operations such as instructions or programming executable by the microcontroller 128. For example, such operations may include various general operations of the ring 100, as well as operations related to the programming for applications that reside on the ring 100. Although a processor may be configured by use of hardwired logic, typical processors in mobile devices are general processing circuits configured by execution of programming.

The ring 100 includes one or more memory elements 130 for storing programming and data. The memory 130 may include a flash memory, a random-access memory (RAM), and/or other memory elements, as needed. The memory 130 stores the programming and instructions needed to perform all or a subset of the functions described herein. The RAM, if present, may operate as short-term storage for instructions and data being handled by the microcontroller 128. Depending on the particular type of handheld electronic device, the ring 100 stores and runs an operating system through which specific applications are executed. The operating system may be a mobile operating system, such as Google Android, Apple iOS, Windows Mobile, Amazon Fire OS, RIM BlackBerry OS, or the like.

In some examples, the ring 100 includes a collection of motion-sensing components referred to as an inertial measurement unit 132. The motion-sensing components may be micro-electro-mechanical systems (MEMS) with microscopic moving parts, often small enough to be part of a microchip. The inertial measurement unit (IMU) 132 in some example configurations includes an accelerometer, a gyroscope, and a magnetometer, to sense the acceleration, angular velocity, and heading of the ring 100 relative to magnetic north, respectively. The position of the ring 100 may be determined by location sensors, such as a GPS receiver, one or more transceivers to generate relative position coordinates, altitude sensors or barometers, and other orientation sensors. The IMU 132 may include or cooperate with a digital motion processor or programming that gathers the raw data from the components and compute a number of useful values about the position, orientation, and motion of the ring 100.

The ring 100 may optionally include additional peripheral sensors, such as biometric sensors, specialty sensors, or display elements integrated with the ring 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

Figure 4:
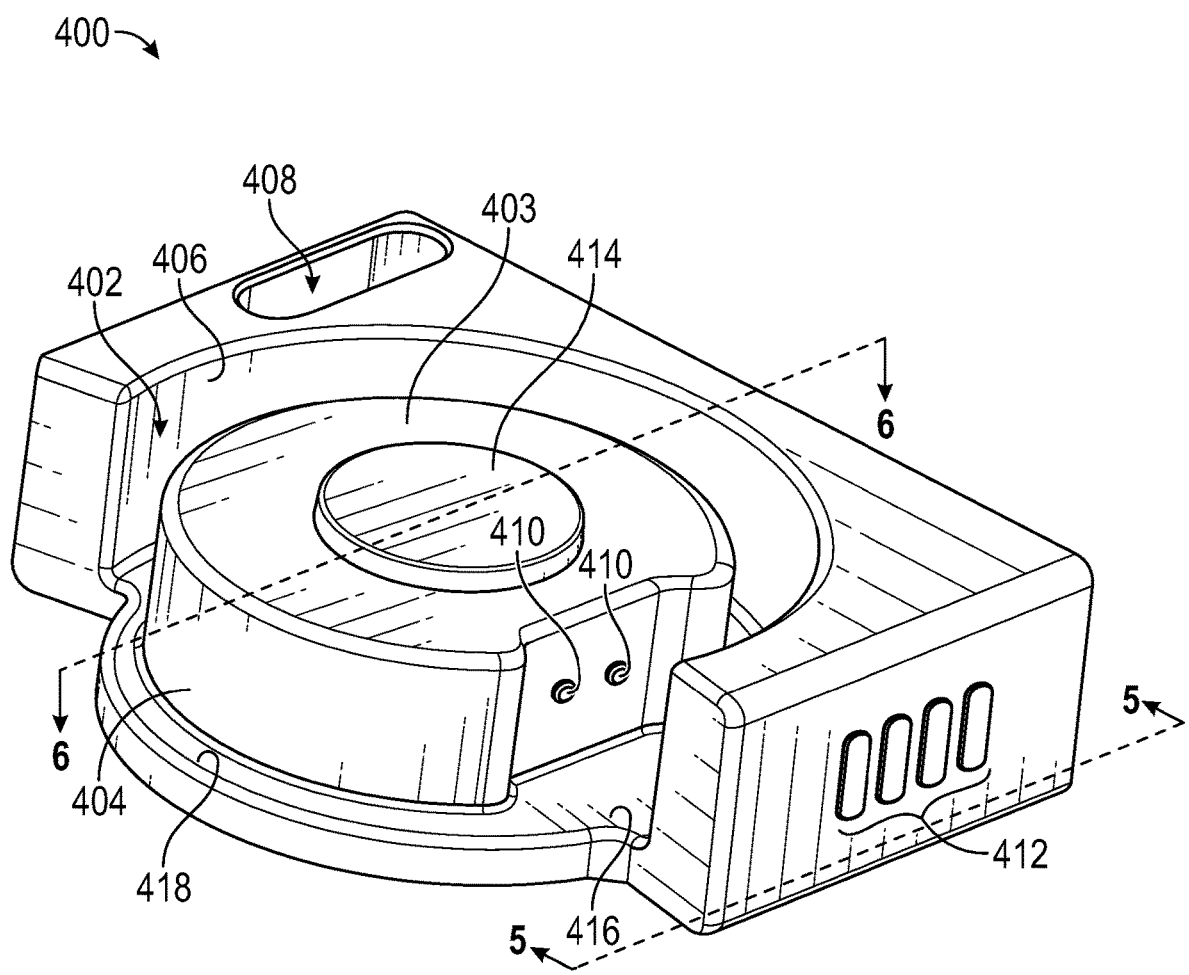
FIG. 4 is a perspective view of an example hardware configuration of an accessory electronic device that may be utilized with the handheld electronic device of FIG. 1.

FIG. 4 is a perspective view of an example hardware configuration of an accessory electronic device 400 (e.g., a smart dock) utilized with a handheld electronic device such as ring 100. Dock 400 comprises a substantially rectangular body that includes a partial or complete circumferential groove (e.g., "ring groove") 402 that defines a raised center 403 sized to at least partially receive ring 100. The ring groove 402 comprises inner wall 404 and outer wall 406. As shown in the example embodiment of FIG. 4, dock 400 may include at least one USB charging port 408, at least one charging pin 410, at least one general-purpose input/output (GPIO) 412, and a release mechanism (e.g., eject button) 414, which as shown is located in raised center 403. In one aspect, the bottom 416 of the groove bottom may transition to a shoulder 418 that a side (108 or 110) of ring 100 may abut. In another aspect, charging pins 410 may extend outwardly from inner wall 404 for contact with charging and communication pins 114 of ring 100. Pins 114 of handheld electronic device 100 comprise, at least in part, a first electronic communication interface that is complementary to the second electronic communication interface of the accessory electronic device 400.

Figure 5:
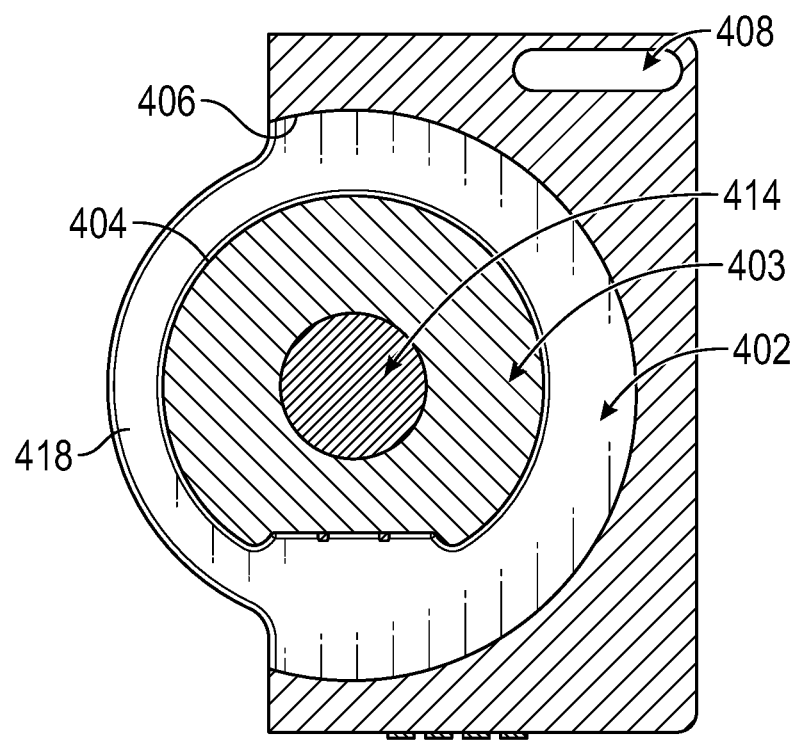
FIG. 5 is a sectional top plan view taken along line 5-5 of FIG. 4.
Figure 6:
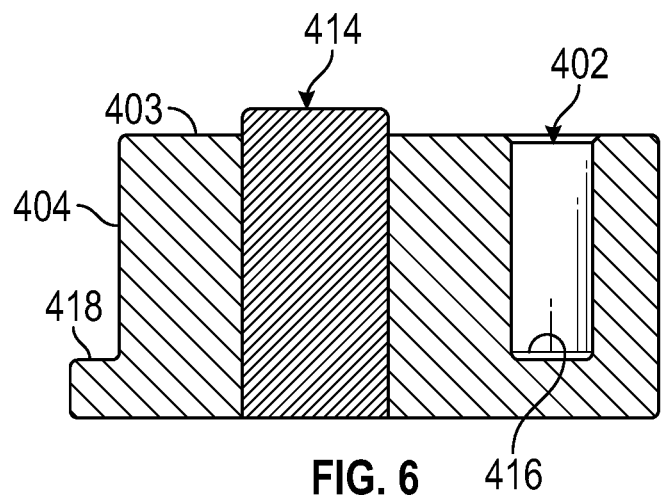
FIG. 6 is a sectional elevation view taken along line 6-6 of FIG. 4.

FIG. 5 is a top plan sectional view of the accessory electronic device of FIG. 4, which shows the relationship of the groove 402, raised center 403 and release mechanism 414, as well as shoulder 418, in greater detail. FIG. 6 is a side sectional view of FIG. 4 also showing additional detail.

Figure 7:
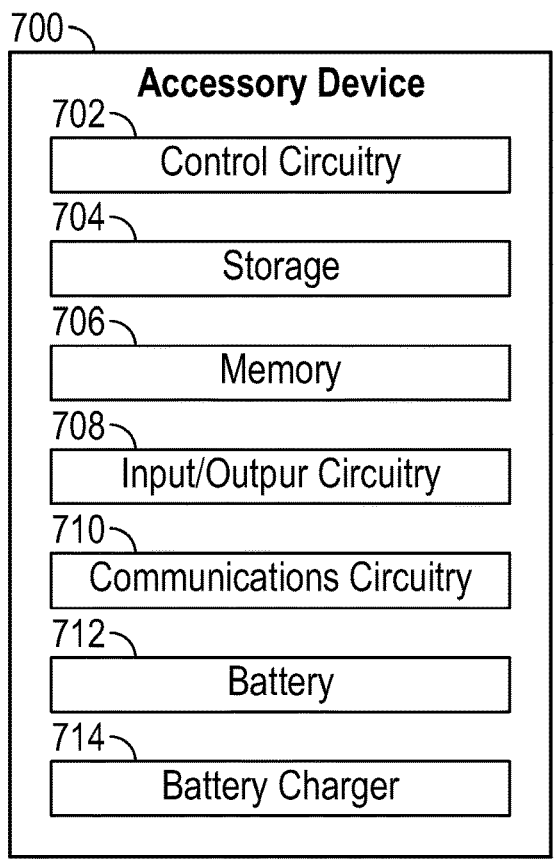
FIG. 7 is a block diagram of an example hardware configuration of the accessory electronic device of FIG. 4.

FIG. 7 is a high-level functional block diagram of an example accessory electronic device, such as a ring dock 400, for simultaneously transferring power and communicating digital data to and from a handheld electronic device such as shown in FIG. 1. Electronic device 700 can include control circuitry 702, storage 704, memory 706, input/output ("I/O") circuitry 708, communications circuitry 710, battery 712, and battery charger 714. In some examples, one or more of the components of electronic device 700 can be combined or omitted (e.g., storage 704 and memory 706 may be combined).

In some examples, electronic device 700 can include other components not combined or included in those shown in FIG. 7 (e.g., motion detection components, kinetics, a display, bus, a positioning system, etc.), or several instances of the components shown in FIG. 7. For the sake of simplicity, only one of each of the components is shown in FIG. 7.

Control circuitry 702 can include any processing circuitry or processor operative to control the operations and performance of electronic device 700. For example, control circuitry 702 can be used to run operating system applications, firmware applications, media playback applications, media editing applications, or any other application. In some examples, control circuitry 702 can drive a display and process inputs received from a user interface.

Storage 704 can include, for example, one or more storage mediums including a hard-drive, solid state drive, flash memory, permanent memory such as ROM, any other suitable type of storage component, or any combination thereof. Storage 704 can store, for example, media data (e.g., image and video files), application data (e.g., for implementing functions on electronic device 700), firmware, user preference information data (e.g., media playback preferences), authentication information, lifestyle information data, wireless connection information data (e.g., information that can enable electronic device 700 to establish a wireless connection), etc.

Memory 706 can include cache memory, semi-permanent memory such as RAM, and/or one or more different types of memory used for temporarily storing data. In some examples, memory 706 can also be used for storing data used to operate electronic device applications, or any other type of data that can be stored in storage 704. In some examples, memory 706 and storage 704 can be combined as a single storage medium.

I/O circuitry 708 can be operative to convert (and encode/decode, if necessary) analog signals and other signals into digital data. In some examples, I/O circuitry 708 can also convert digital data into any other type of signal, and vice-versa. For example, I/O circuitry 708 can receive and convert physical contact inputs (e.g., from a multi-touch screen), physical movements (e.g., from a sensor), analog audio signals (e.g., from a microphone), or any other input. The digital data can be provided to and received from control circuitry 702, storage 704, memory 706, or any other component of electronic device 700. Although I/O circuitry 708 is illustrated in FIG. 7 as a single component of electronic device 700, several instances of I/O circuitry 708 can be included in electronic device 700.

Electronic device 700 can include any suitable interface or component for allowing a user to provide inputs to I/O circuitry 708. For example, electronic device 700 can include any suitable input mechanism, such as, for example, a button, touchpad, or a touch screen. In some examples, electronic device 700 can include a capacitive sensing mechanism, or a multi-touch capacitive sensing mechanism.

In some examples, electronic device 700 can include specialized output circuitry associated with output devices such as, for example, one or more audio outputs.

In some examples, I/O circuitry 708 can include display circuitry (e.g., a screen or projection system) for providing a display visible to the user. For example, the display circuitry can include a screen (e.g., an LCD screen) that is incorporated in electronics device 700. In some examples, the display circuitry can include a coder/decoder (CODEC) to convert digital media data into analog signals. For example, the display circuitry (or other appropriate circuitry within electronic device 700) can include video CODECs, audio CODECs, or any other suitable type of CODEC.

The display circuitry also can include display driver circuitry, circuitry for driving display drivers, or both. The display circuitry can be operative to display content (e.g., media playback information, application screens for applications implemented on the electronic device, information regarding ongoing communications operations, information regarding incoming communications requests, or device operation screens) under the direction of control circuitry 702. Alternatively, the display circuitry can be operative to provide instructions to a remote display.

Figure 11:
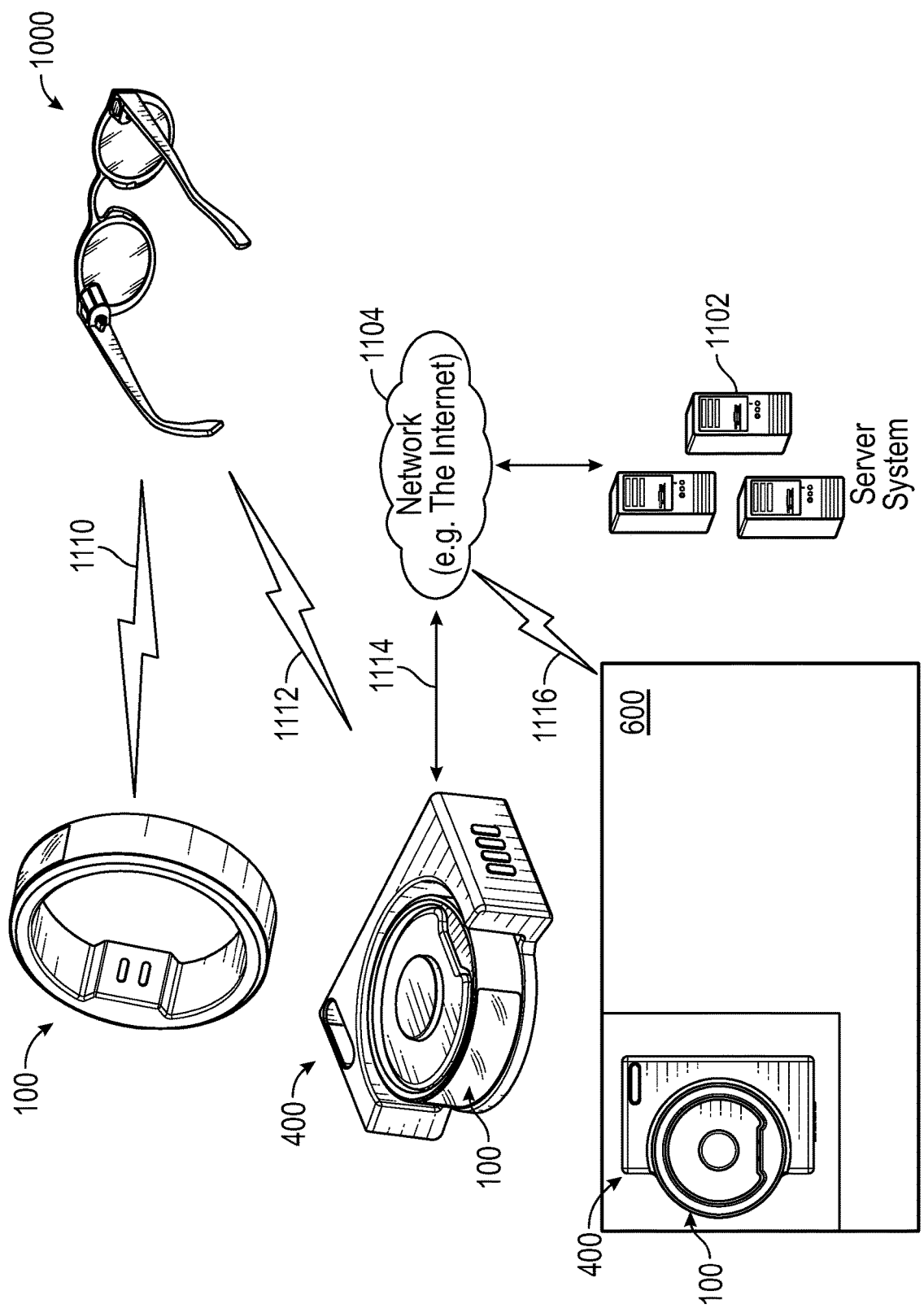
FIG. 11 is a diagrammatic representation of an example communication system including a handheld electronic device, eyewear electronic device, accessory electronic device, a second accessory electronic device, and a server system connected via various networks.

Communications circuitry 710 can include any suitable communications circuitry operative to connect to a communications network and to transmit communications (e.g., voice or data) from electronic device 700 to other devices within network 1104 via wired connection 1114 or via wireless connection 1116 such as via second accessory device 600 (see FIG. 11). Communications circuitry 710 can be operative to interface with the communications network using any suitable communications protocol such as, for example, Wi-Fi (e.g., a 802.11 protocol), Bluetooth, BLE (Bluetooth Low-Energy), radio frequency systems (e.g., 900 MHz, 1.4 GHz, and 5.6 GHz communication systems), infrared, GSM, GSM plus EDGE, CDMA, LTE and other cellular protocols, VOIP, or any other suitable protocol.

In some examples, communications circuitry 710 can be operative to create a communications network using any suitable communications protocol. For example, communications circuitry 710 can create a short-range communications network using a short-range communications protocol to connect to other devices. For example, communications circuitry 710 can be operative to create a local communications network using a Bluetooth protocol to couple electronic device 700 with a Bluetooth headset or other Bluetooth enabled device.

Electronic device 700 can include one more instances of communications circuitry 710 for simultaneously performing several communications operations using different communications networks, although only one is shown in FIG. 7 to avoid overcomplicating the drawing. For example, electronic device 700 can include a first instance of communications circuitry 710 for communicating over a cellular network, and a second instance of communications circuitry 710 for communicating over Wi-Fi or using Bluetooth. In some examples, the same instance of communications circuitry 710 can be operative to provide for communications over several communications networks.

In some examples, electronic device 700 can be coupled to a host device for data transfers, synching the communications device, software or firmware updates, providing performance information to a remote source (e.g., providing riding characteristics to a remote server) or performing any other suitable operation that can require electronic device 700 to be coupled to a host device. Several electronic devices 700 can be coupled to a single host device using the host device as a server. Alternatively, or additionally, electronic device 700 can be coupled to several host devices (e.g., for each of the plurality of the host devices to serve as a backup for data stored in electronic device 700).

In some examples, electronic device 700 includes a power line communication IC module with a digital interface (e.g., I$^2$C) capable of bidirectionally transferring power and digital data simultaneously from or to ring 100 and, optionally, additional electronic devices such as those comprising a remote controller in operable communication with dock 400.

The battery 712 may be sized and shaped to fit within the body of the dock 400, with connections to one or more charging and communications pins 410 and battery charger 714.

Figure 8:
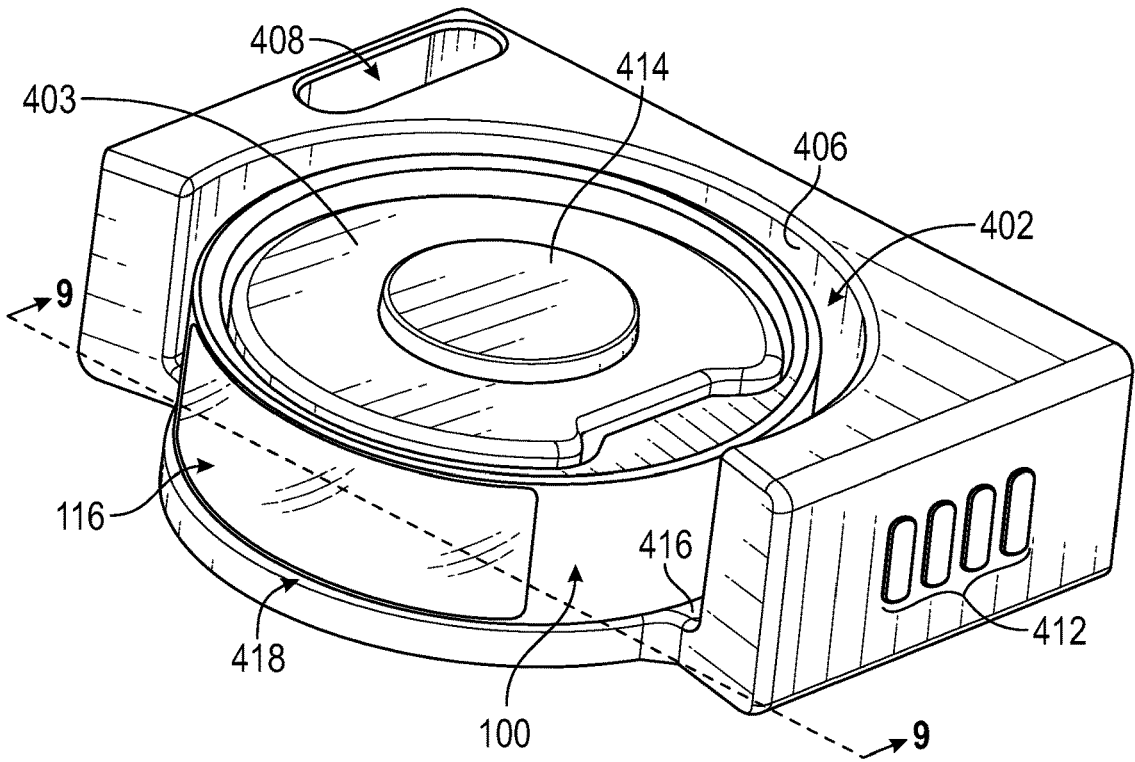
FIG. 8 is a perspective view of the handheld electronic device of FIG. 1 in an example configuration with the accessory electronic device of FIG. 4.
Figure 9:
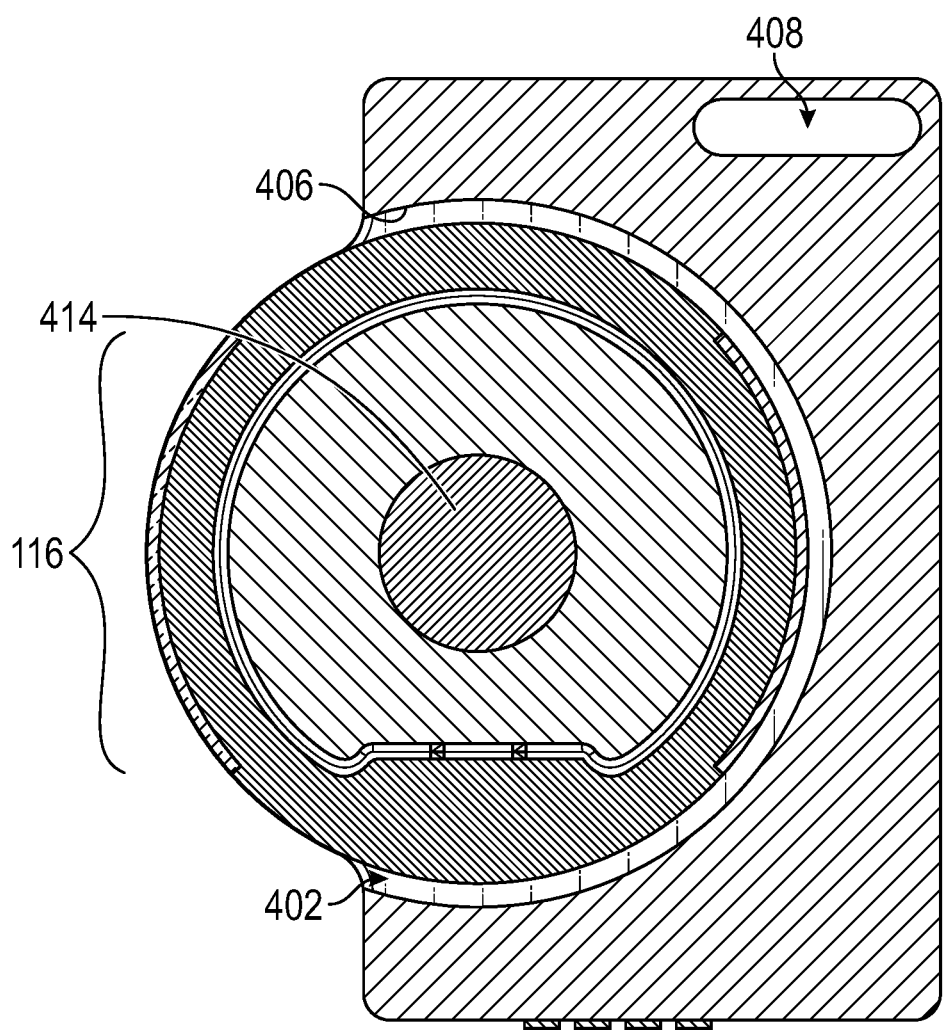
FIG. 9 is a sectional top plan view taken along line 9-9 of FIG. 8.

FIG. 8 is a perspective view of the handheld electronic device of FIG. 1 in a retained (i.e., docked) position by the accessory device of FIGS. 4-6. FIG. 9 is a top plan sectional view of FIG. 8 that further illustrates the relationship of the touchpad 116 while ring 100 is in its docked position. Touchpad 116 faces outwardly and is substantially coextensive with shoulder 418, such that touchpad 116 is accessible to a user during charging and/or communication while in the retained position (i.e., docked).

Figure 10:
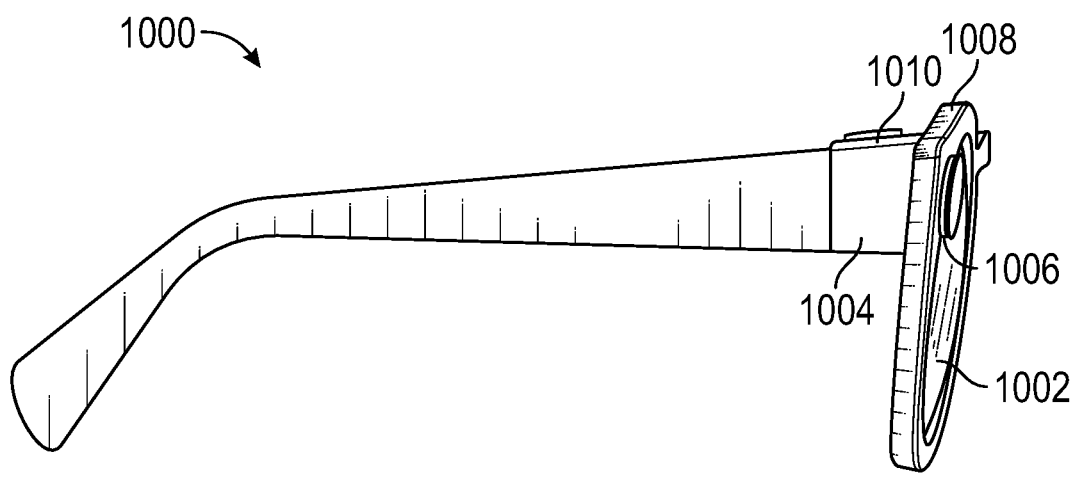
FIG. 10 is a side view of an example hardware configuration of an eyewear electronic device.

In the exemplary embodiment shown in FIGS. 8 and 9, when ring 100 is in a retained position (i.e., docked) with dock 400, one or more contacts 410 forming a second electronic communication interface are in substantial contact with the first electronic communication interface of ring 100 that includes at least one charging/communication contact(s) or pin(s) 114 of ring 100 for providing auxiliary power, recharging the power source and transferring data between the ring 100 and another device (such as eyewear electronic device 1000 or a second accessory device 600 (see FIGS. 10 and 11). When docked, a bidirectional communication link is established that permits data transfer between ring 100, dock 400, and, optionally, other devices that may be in communication with dock 400, such as second accessory electronic device 600 shown in FIG. 11.

FIG. 10 is a side view of an example hardware configuration of an eyewear electronic device 1000 utilized in an example of the handheld electronic device of FIG. 1, as described herein. Eyewear electronic device 1000 includes an optical assembly 1002 with an image display and a chunk 1004 that includes a camera 1006 that captures image information. Camera 1006 is coupled to or disposed on the flexible PCB 140B and covered by a visible-light camera cover lens, which is aimed through an opening formed in the frame 1008. For example, the rim 1010 of the frame 1008 is connected to the chunk and includes the opening for the visible-light camera cover lens. Examples of suitable cameras 1006 include a high-resolution complementary metal-oxide-semiconductor (CMOS) image sensor and a digital VGA camera (video graphics array). The eyewear electronic device 1000 may capture image sensor data from the visible-light camera along with geolocation data, digitized by an image processor, for storage in a memory.

Disposed inside the chunk 1004 are various interconnected circuit boards, such as PCBs or flexible PCBs, that include controller circuits for camera 1006, microphone(s), low-power wireless circuitry (e.g., for wireless short-range network communication via Bluetooth™), high-speed wireless circuitry (e.g., for wireless local area network communication via WiFi).

Eyewear electronic device 1000 may include circuitry that includes a processor, memory, and wireless circuitry that forms part of an eyewear communication interface for communication with the handheld electronic device 100 or accessory electronic device 400, or both. The processor may be any processor capable of managing communications and operation of any general computing system needed for eyewear electronic device 1000. The processor includes processing resources needed for managing data transfers on wireless connection 1112 (see FIG. 11) to a wireless local area network (WLAN) using wireless circuitry. In certain examples, wireless circuitry is configured to implement Institute of Electrical and Electronic Engineers (IEEE) 802.11 communication standards, also referred to as Wi-Fi. In other examples, other high-speed communications standards may be implemented by the wireless circuitry. The wireless circuitry of the eyewear device 100 can include short range transceivers (Bluetooth™) and wireless wide, local, or wide-area network transceivers (e.g., cellular or WiFi).

FIG. 11 is a functional block diagram of an example system 1100 including a handheld electronic device 100 (e.g., a ring), an accessory electronic device 400 (e.g., a dock), a second accessory device 600, an eyewear electronic device 1000, and a server system 1102 connected via various networks 1104 such as the Internet. The eyewear electronic device 1000 includes components that allows it to collect data about the position, orientation, and motion of the eyewear electronic device 1000 and to cooperate with the ring 100 to execute desired functions. As noted above with regard to eyewear electronic device 1000, it comprises wireless communications circuitry to form an eyewear communications interface that enables it to communicate with handheld electronic device 100 via wireless connection 1110 and/or with accessory electronic device 400 via wireless connection 1112.

The system 1100 may further utilize components of the accessory electronic device 400, and second accessory electronic device 600, and server system 1102 to execute, process or communicate data to and from eyewear electronic device 1000. In this aspect, functions of the system 1100 can be shared or distributed across the eyewear electronic device 1000, the ring 100, accessory electronic device 400, second accessory electronic device 600, or other accessory devices, and/or the server system 1102.

Any functionality for the eyewear electronic device 1000, the ring 100, the accessory device 400, second accessory electronic device 600, or other accessory devices, and the server system 1102 can be embodied in one more computer software applications or sets of programming instructions. According to some examples, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™ WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:
1. A communication system, comprising:
an eyewear electronic device comprising an eyewear communication interface;
a handheld electronic device comprising a wireless communication interface and a first electronic communication interface, the wireless communication interface configured for communication with the eyewear elec- tronic device, wherein the handheld electronic device is a ring configured to be worn on a finger of a user;

an accessory electronic device, wherein the accessory device comprises a body sized to substantially engage the handheld electronic device and comprises a second electronic communication interface complementary to the first electronic communication interface for transferring at least one of signals or power therebetween when the handheld electronic device is releasably engaged by the accessory electronic device;

wherein the body of the accessory electronic device comprises a substantially circumferential groove sized to receive and releasably engage the ring-shaped handheld electronic device.

2. The communication system of claim 1, wherein the handheld electronic device and the accessory electronic device are in electronic communication in the absence of a wireless connection therebetween.

3. The communication system of claim 1, wherein the accessory electronic device further comprises a wireless communication interface, wherein the accessory communication interface is configured to communicate with the eyewear communication interface.

4. The communication system of claim 1, wherein the accessory electronic device comprises a housing, wherein the handheld electronic device is releasably engaged by the accessory electronic device or is at least partially contained within said housing.

5. The communication system of claim 1, wherein the accessory electronic device is in electronic communication with a second accessory electronic device.

6. The communication system of claim 5, wherein the second accessory electronic device is a remote control electronic device.

7. The communication system of claim 5, wherein the second accessory electronic device is in electronic communication with and configured to remotely control the eyewear electronic device.

8. The communication system of claim 1, wherein the electronic communication interface comprises at least one contact for engagement with at least one corresponding contact on the handheld electronic device.

9. The communication system of claim 1, wherein the accessory electronic device further comprises:
   a battery for storing power; and
   a retainer mechanism that releasably engages the handheld electronic device.

10. The communication system of claim 1, wherein the ring comprises one or more of: an input device, a transceiver, and an inertial measurement unit.

11. The communication system of claim 10, wherein the substantially circumferential groove includes a portion lacking an outer wall.

12. The communication system of claim 11, wherein the handheld electronic device has an outer surface comprising an input device that remains accessible to a user while the handheld electronic device is in releasable engagement by the accessory electronic device.

13. A method of establishing a communication link, comprising:
   providing an eyewear electronic device configured for wireless communication;
   providing a handheld electronic device configured for wireless communication with the eyewear electronic device and further comprising a first electronic communication interface having at least one electrical contact, wherein the handheld electronic device is a ring configured to be worn on a finger of a user;
   providing an accessory electronic device comprising a body and having a second electronic communication interface having at least one electrical contact for engagement with at least one contact on the handheld electronic device, wherein the body of the accessory electronic device comprises a substantially circumferential groove sized to receive and releasably engage the ring-shaped handheld electronic device,
   releasably engaging the handheld electronic device by inserting it in the accessory electronic device; and
   establishing the communication link between the eyewear electronic device and the accessory electronic device.

14. The method of claim 13, further comprising the step of:
   transferring signals and power between the handheld electronic device and the accessory electronic device.

15. The method of claim 13, wherein the accessory electronic device is in electronic communication with a second accessory electronic device to form a second communication link.

16. The method of claim 15, wherein the second communication link is wired.

17. The method of claim 15, wherein the second accessory electronic device is a remote control electronic device.

18. The method of claim 15, wherein the second accessory electronic device is in electronic communication with the eyewear electronic device.

* * * * *